Patented Mar. 22, 1932

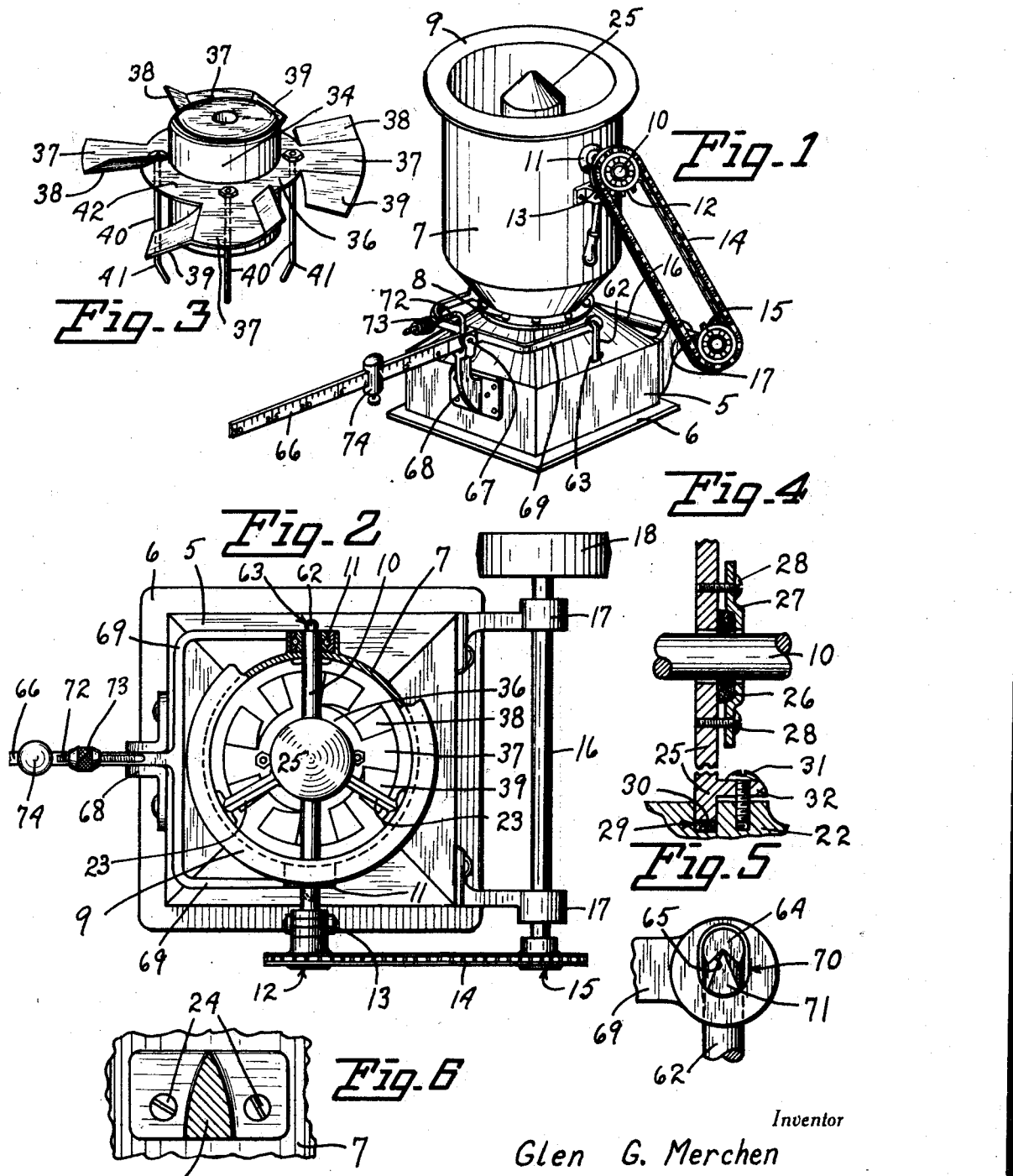

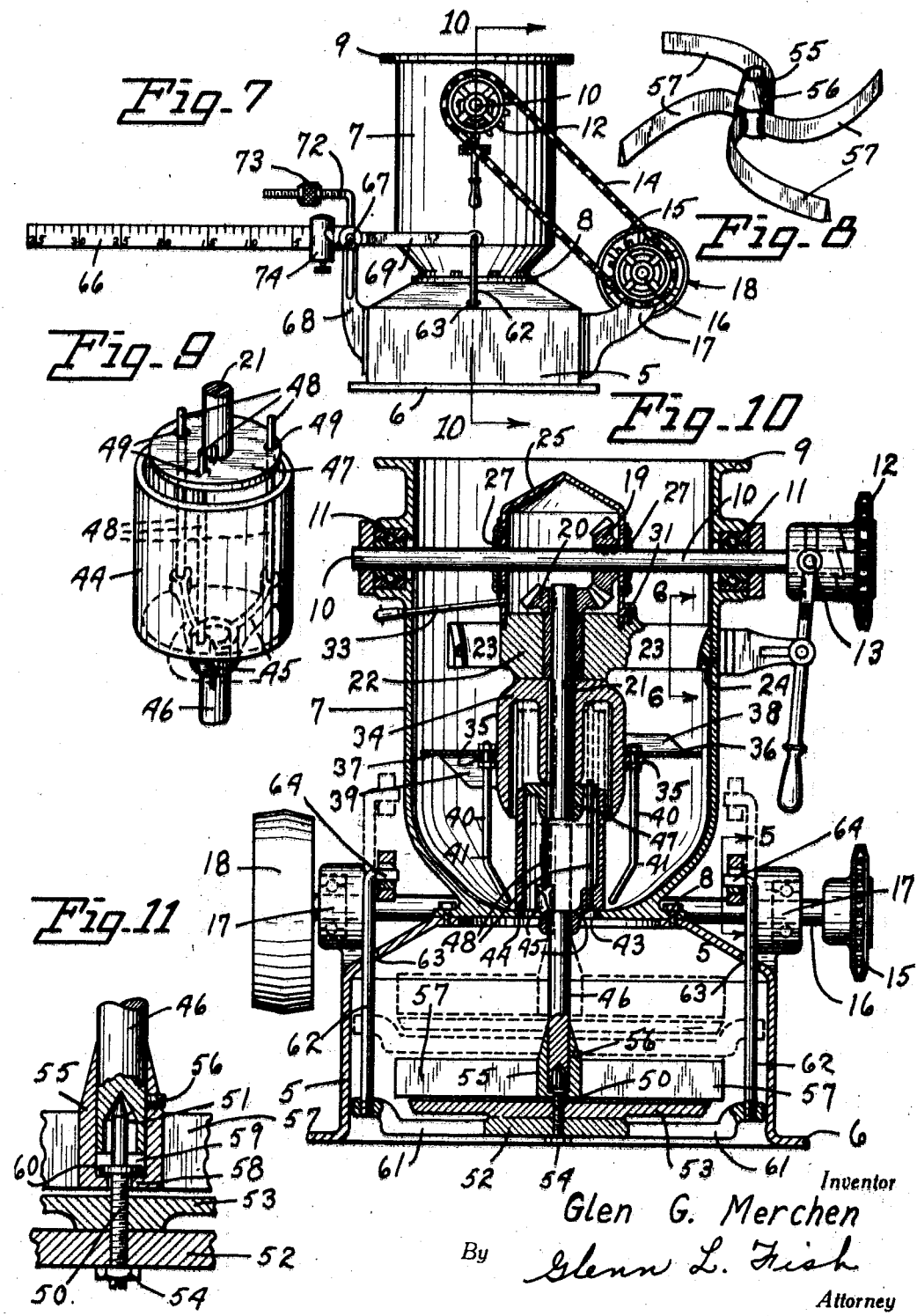

1,850,179

UNITED STATES PATENT OFFICE

GLEN G. MERCHEN, OF SPOKANE, WASHINGTON, ASSIGNOR TO MERCHEN SCALE FEEDER COMPANY, OF SPOKANE, WASHINGTON

AUTOMATIC WEIGHING MACHINE

Application filed March 3, 1930. Serial No. 432,755.

My invention relates to automatic weighing machines and certain objects of the invention are to provide a weighing machine for use in accurately and readily weighing or blending any amount of grain or other fine material. Further objects are to provide a weighing machine having an upper and a lower casing with a gate disposed at their contracted point of joinder and a balance scale arrangement connected with the gate having a counterweight which may be set on the scale beam whereby the gate is raised to allow passage of a predetermined amount of grain or other material per unit of time. Other objects are to provide mechanical means for agitating and assisting the steady and uniform passage of material through the machine. Still further objects are to provide novel and improved means for lifting the gate, novel means for rotary movement of the scraper member for the grain pan, improved agitator means, and other novel details of construction and arrangement.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in perspective of the complete machine;

Fig. 2 is a top plan view of the same;

Fig. 3 is a detail view in perspective of the agitating means and associated parts;

Fig. 4 is a detail view in vertical section showing the packing gland arrangement for the drive shaft;

Fig. 5 is a detail view in vertical section taken on a broken line 5, 5 of Fig. 10 and showing the pivot arrangement at the end of the scale beam yoke arms in elevation;

Fig. 6 is a detail view in vertical section of one of the arms of the spider support for the upper vertical shaft taken on a broken line 6, 6 of Fig. 10;

Fig. 7 is a general view in side elevation of the machine;

Fig. 8 is a detail view in perspective of the rotary scraper member for the grain pan;

Fig. 9 is a detail view of the cylindrical rotary gate and associated parts;

Fig. 10 is a view in central vertical section of the machine taken substantially on a broken line 10, 10 of Fig. 7; and Fig. 11 is an enlarged detail view partly in elevation and partly in vertical section showing the pivot supporting pin and associated parts.

Referring to the drawings throughout which like reference numerals indicate like parts in the several views, the numeral 5 designates a lower casing having a flange 6 on its lower edge whereby the casing may be connected with a delivery chute, bin or the like. An upper casing 7, that is preferably though not necessarily of cylindrical construction, is superimposed upon said lower casing and the two convergently reduced connecting end portions of the casings are secured together at 8. The top edge of the upper casing is provided with a flange 9 whereby it may be placed under a receiving chute, bin or the like.

The upper casing 7 is provided with a shaft 10 horizontally mounted in suitable bearings 11 in the upper end portion of said casing. One exterior projecting end of said shaft is provided with a sprocket wheel 12 and a clutch 13 provides means whereby said sprocket may be thrown in or out of rotary connection with said shaft. Said sprocket wheel is provided with a chain 14 leading to another sprocket 15 keyed to a shaft 16 that is mounted in bracket bearings 17 secured to the lower casing 5. The other end of said shaft is provided with a pulley 18 to which power may be supplied from any desired source.

A bevel gear 19 is keyed to the central portion of the horizontal shaft 10 and is in mesh with a corresponding gear 20 that is keyed to the upper end of an upper vertical shaft 21. Said vertical shaft is supported by the hub portion 22 of a spider member whose arms 23 are beveled to form relatively sharp upper edges as shown in Fig. 6 whereby they will not obstruct or resist the free passage of material through the casings. The ends of said arms are provided with integral plates that are secured to the interior wall of the upper casing 7 by screws 24.

The hub portion 22 of the spider member serves as a support for a housing 25 which encloses the bevel gears 19 and 20 and also a portion of the shaft 10 passing therethrough. The bearings through said housing for said shaft on each side are packed with a felt pad 26 having a plate 27 held in compression therewith by screws 28, as clearly shown in Fig. 4, whereby the lubricant within said housing is prevented from leaking through the bearings. In order to prevent the lubricant from leaking through the bottom of the housing a groove 29 is cut in the hub 22 and a felt packing 30 is placed within the groove. The lower edge of the housing is inserted in said groove and screws 31 passing through a flange or lugs 32 on the lower end portion of said housing and into said hub provide means whereby a leak proof connection is made as will be understood. An oil supply tube 33 leads through the casing 7 and into the housing 25 for supplying lubricant to said housing.

A bell member 34 is keyed to the upper vertical shaft 21 contiguously below the spider hub 22. Said bell member is provided with a flange 35 extending horizontally around its exterior central portion and an agitator member 36 is bolted to said flange. Said agitator is provided with a plurality of wings comprising horizontal portions 37 having flaps 38 bent upwardly on one side and flaps 39 bent downwardly on the other side as most clearly shown in Fig. 3. The bolts 40 that secure said agitator to said flange extend downwardly and are bent inwardly at 41 terminating at points close to the convergent bottom portion of the casing 7. A narrow flange 42 on top of said agitator and close to the bell member prevents the grain from collecting too close to said bell where it would be outside of the path and influence of the agitator.

An annular opening 43 is provided centrally in the convergent bottom portion of the casing 7 and extends through the top of the lower casing 5 whereby grain may pass from said upper to said lower compartment casing. Said opening is adapted to be normally closed by the bottom edge of a hollow cylindrical gate 44 which is shown in detail in Fig. 9. Said gate is supported by a spider member 45 whose arms are fixed to its lower inner wall portion and whose hub is keyed to the upper end of a lower vertical shaft 46. A collar 47, whose diameter is slightly less that the inner diameter of the cylindrical gate, is keyed to the lower end of the upper vertical shaft 21 and protrudes into the upper end of said gate as shown in Fig. 10. In order to establish a connection between said upper and lower vertical shafts a plurality of vertical rods 48 have their lower ends threaded into the arms of the spider 45 and their upper ends extending slidably through holes 49 in the collar 47.

The lower vertical shaft 46 is supported by a pivot screw 50 whose conical upper end engages into a conical recess 51 in the lower end of said shaft as shown in Fig. 11. The lower major half portion of said screw is threaded through a bottom disc plate 52 and an adjoining grain pan 53 thus securing said plate and pan together. A lock nut 54 may be installed on the lower end of said screw for additional security if desired. A rotary scraper member, shown in detail in Fig. 8, has its hub 55 secured to the lower end portion of the shaft 46 by means of a set screw 56. The blades 57 of said scraper taper to a sharp upper edge so they will not obstruct the passage of the grain and the upper portion of their hub is conical in shape in order to prevent grain from lodging thereon.

The opening in the hub 55 which receives the shaft 46 is reduced at its lower end sufficiently to allow the screw 50 to pass loosely therethrough thus providing an annular shoulder 58. The bottom of said shaft terminates short of said shoulder thus providing a space 59 within said hub and a collar 60 integrally or fixedly disposed on the pivot screw in such position that it does not normally impinge any part of the interior hub wall, providing means whereby the scraper member may rotate freely with the lower vertical shaft 46 around the pivot screw. Said vertical shaft is of the proper length to support the rotary gate with the lower cylindrical edge in slight clearance of the bottom of the upper casing 7 whereby said gate may rotate in the lowered position and serve as a closure for the opening 43 at the same time.

The bottom disc plate 52 is provided with a pair of diametrically opposite arms 61 into the outer ends of which the lower ends of a pair of vertical rods 62 are threadedly secured. Said rods pass slidably through holes 63 in the lower casing 5 and their upper end portions are bent at right angles to form horizontal end portions 64. The undersides of said end portions are provided with V-shaped notches or grooves 65 as clearly shown in Fig. 5 of the drawings. A scale beam 66 that is pivotally supported at 67 by a bracket 68 secured to the lower casing is provided with a yoke 69 whose arms extend on each side of said casing to the horizontal end portions of the aforesaid vertical rods. The enlarged end portions of said yoke arms are each provided with an aperture 70 from the bottom of which a pivot point 71 projects upwardly and the vertical rods are supported by said pivot points which engage in the V-grooves on the undersides of their horizontal end portions. The scale beam is provided with a threaded adjusting arm 72 adjacent its joinder with said yoke and a weight 73 on said threaded arm provides means whereby the scale beam may be ajustably balanced as is understood.

The scale beam 66 is provided with the usual slidable counterweight 74 and we will assume that said scale beam has been adjustably balanced with said counterweight registering with the zero mark which has thus been established on said beam. The machine is adapted to be operated by a weight and time passage system or, in other words, the number of pounds of grain that will pass through the machine in a given time. The graduations on the scale beam are originally determined in an experimental manner by placing the counterweight at a certain distance out from the zero mark which will cause the cylindrical gate 44 to be lifted a certain distance. A stream of grain is then passed through the machine for one minute of time, for example, and the grain is then carefully weighed and the number of pounds which it weighs is marked on the scale beam at the particular setting of the counterweight. The counterweight is then moved to another point on the beam and grain is again passed through the machine for one minute of time and weighed and another number corresponding to its weight is marked on said beam at the counterweight. After a sufficient number of points have thus been determined in this manner the entire beam is sub-divided into graduations. It will now be apparent that said counterweight when placed at any number on the scale will cause the cylindrical gate to open a sufficient distance to allow a number of pounds of the grain to pass therethrough equal to said number on the scale in one minute of time. It will be understood that the scale beams of other machines of the same size may be marked directly by using the beam whose graduations have been determined experimentally as a standard.

The machine is primarily intended for the purpose of readily and accurately blending grain or the like. For instance if it is desired to blend several grades of wheat for milling purposes one machine is placed under each chute leading from the bins containing the different grades and all of said machines are arranged to discharge into one bin. Thus by properly setting the different scales of the machines and accurately timing the flow of grain through each machine the grain may be quickly blended in accordance with any desired and predetermined amounts of each respective grade. Each machine is automatic in its control and insures a steady and uniform flow. Automatic means for shutting off the different machines at predetermined times may be installed if so desired. It will be understood, of course, that the machines may be used as single units in weighing any amount of fine material which will flow through, such as alfalfa, bran, ground bone and the like.

The machine is, of course, set in motion during the weighing process and while the grain is passing through the upper casing 7 the wings of the agitator 36 keep it thoroughly churned thus preventing it from becoming sluggish in its downward movement. The rods 40, depending from the agitator, are also adapted to keep the grain stirred up, prevent it from packing against the cylindrical gate 44 and cause it to flow through the opening 43 in a steady and uniform stream. The blades 57 of the rotary scraper member just clear the disc shaped pan 53 and extend beyond the peripheral edge of said pan whereby the rotary movement of said scraper will continually sweep said pan free of all grain or other material falling thereon.

It will be understood that the counterweight 74 pivotally raises the yoke 69 whose arms lift the vertical rods 62 thus lifting the bottom disc 52 connected therewith together with the grain pan 53, lower vertical shaft 46 revolubly mounted on the pivot screw 50, and the cylindrical gate 44 connected with said shaft by the spider member 45. The extreme open position of said gate is shown in dotted lines in Fig. 10 of the drawings. As said gate is raised the vertical rods 48 pass slidably through the holes in the collar 47 fixed to the upper vertical shaft 21. Said rods thus serve as guides for said gate and as connecting means whereby the lower vertical shaft and its connecting elements are caused to rotate with the upper vertical shaft.

Having thus described my invention, it being understood that minor changes may be resorted to in its construction and arrangement without departing from the scope and spirit of the invention, what I claim and desire to secure by Letters Patent of the United States is:—

1. An automatic weighing machine comprising a vertically arranged double compartment casing having a convergent portion with an opening therethrough, a gate disposed at said convergent portion normally arranged to close said opening, a balance scale connected with the gate, and a counterweight for said scale adapted to raise the gate a predetermined distance in accordance with its setting on the scale.

2. An automatic weighing machine comprising convergent upper and lower compartment casings, said casings connected at their convergent ends with an annular opening therethrough, a cylindrical gate arranged to normally close the opening, a balance scale connected with the gate, and a counterweight for said scale adapted to raise the gate a predetermined distance in accordance with its setting on the scale.

3. An automatic weighing machine comprising convergent upper and lower compartment casings, said casings connected at their convergent ends and having an opening therethrough, a gate arranged to normally close said opening, mechanical means for imparting rotary motion to said gate, a balance scale connected with the gate, and a counterweight for said scale adapted to raise the gate a predetermined distance in accordance with its setting on the scale.

4. An automatic weighing machine comprising convergent upper and lower casings, said casings connected in vertical arrangement at their convergent ends and having an opening therethrough, a horizontal drive shaft for the upper casing, an upper vertical shaft in gear with said horizontal shaft, a lower vertical shaft slidably connected with the upper vertical shaft, a gate revolubly carried by said lower shaft and arranged to normally close the opening at the connection of the two casings, a balance scale connected with said lower vertical shaft, and a counterweight for said scale adapted to raise the lower vertical shaft and lift the gate a predetermined distance in accordance with its setting on the scale.

5. An automatic weighing machine comprising convergent upper and lower casings, said casings connected at their convergent ends and having an opening therethrough, a horizontal drive shaft for the upper casing, an upper vertical shaft in gear with said horizontal shaft, a lower vertical shaft slidably connected with the upper vertical shaft, a gate revolubly carried by said lower vertical shaft arranged to normally close the opening at the connection of the two casings, a grain pan, a pivot support for the lower vertical shaft carried by the grain pan, a balance scale connected with said grain pan, and a counterweight for said scale adapted to raise the pan and lower vertical shaft and lift the gate a predetermined distance in accordance with its setting on the scale.

6. An automatic weighing machine comprising two connected casings with a reduced portion at their connection having an opening therethrough, a horizontal drive shaft for the upper casing, an upper vertical shaft rotated by said horizontal shaft, a lower vertical shaft slidably connected with the upper vertical shaft, a gate revolubly carried by said lower shaft arranged to normally close the opening at the connection of the two casings, a grain pan, a pivot support for the lower vertical shaft carried by the grain pan, a rotary scraper member on the lower shaft for the grain pan, a balance scale connected with said pan, and a counterweight for said scale adapted to raise the pan and lower vertical shaft and lift the gate a predetermined distance in accordance with its setting on the scale.

7. An automatic weighing machine comprising a pair of convergent casings vertically connected at their contracted ends with an opening therethrough, a gate for the opening, a balance scale adapted to raise the gate to open position in accordance with the setting of its counterweight, a horizontal drive shaft, an upper and a lower vertical shaft, a slidable connection for said shafts an agitator carried by the upper shaft, and depending bolts for said agitator extending to the bottom of one of the casings.

8. An automatic weighing machine comprising a pair of convergent casings vertically connected at their contracted ends with an opening therethrough, a gate for the opening, a balance scale adapted to raise the gate to open position in accordance with the setting of its counterweight, a horizontal drive shaft, an upper and a lower vertical shaft, a slidable connection for said vertical shafts, a gear connection between the horizontal and upper vertical shafts, a lubricant housing for said gear connection, leak proof means for said housing, an agitator carried by the upper vertical shaft, and depending bolts for said agitator extending to the bottom of the upper casing.

In testimony whereof I affix my signature.
GLEN G. MERCHEN.